US005993932A

United States Patent [19]

Friedl et al.

[11] Patent Number: 5,993,932

[45] Date of Patent: Nov. 30, 1999

[54] FOAM MATERIAL ELEMENT FOR SOUND-DAMPING CAVITIES

[75] Inventors: Wolfgang Friedl; Ulrich Heitmann; Andreas Harms, all of Memmingen, Germany

[73] Assignee: Metzeler Schaum GmbH, Memmingen, Germany

[21] Appl. No.: 09/216,308

[22] Filed: Dec. 18, 1998

Related U.S. Application Data

[63] Continuation of application No. PCT/EP97/02886, Jun. 4, 1997.

[30] Foreign Application Priority Data

Jun. 18, 1996 [DE] Germany ........................... 196 24 314

[51] Int. Cl.[6] ........................................................ B32B 1/06

[52] U.S. Cl. ........................... 428/71; 428/69; 428/317.9; 428/218

[58] Field of Search ................................ 428/69, 71, 218, 428/317.9; 52/309.4

[56] References Cited

U.S. PATENT DOCUMENTS 5,529,824 6/1996 Walendy et al. .......................... 428/71

*Primary Examiner*—Alexander Thomas

*Attorney, Agent, or Firm*—Herbert L. Lerner; Laurence A. Greenberg

[57] ABSTRACT

A foam material element for sound-damping cavities, particularly for light metal extruded profiles used in rail car construction. The foam material element has a foam material sandwich with at least two layers, namely a resilient layer and at least one heavy layer disposed on the resilient layer. The resilient layer is formed of soft foam polyurethane and the heavy layer is formed of a flocculated foam polyurethane compound. Prior to being inserted in a cavity to be sound-proofed, the foam material element is compressed and weld-sealed in an air-tight film. The element is inserted through an opening of the cavity in its compressed condition. After insertion and placement of the foam material element, the film is opened and, as a result of its exposure to air, the foam material element expands to such a degree that at least one heavy layer, biassed by the resilient layer, comes into contact with the walls substantially over a broad surface area.

14 Claims, 1 Drawing Sheet

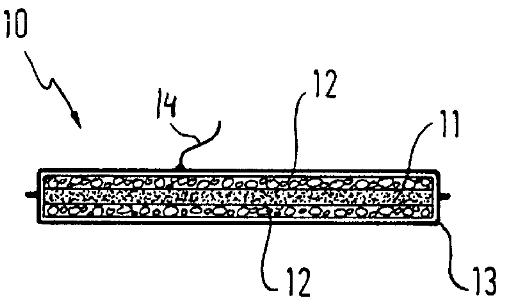
Fig. 1
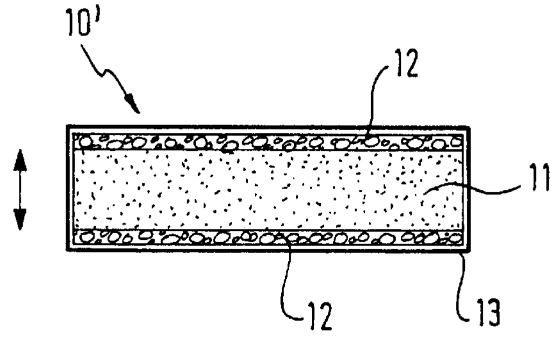
Fig. 2
Fig. 3
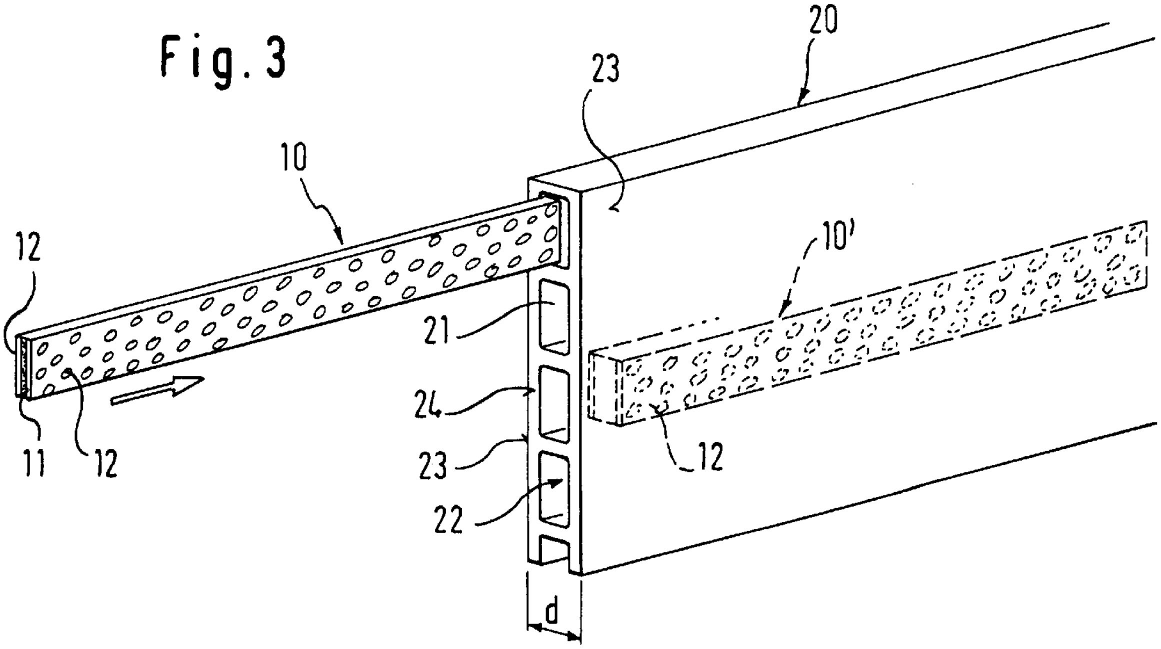

FOAM MATERIAL ELEMENT FOR SOUND-DAMPING CAVITIES

CROSS-REFERENCE TO RELATED APPLICATION

This is a continuation of copending International Application PCT/EP97/02886, filed Jun. 4, 1997, which designated the United States.

BACKGROUND OF THE INVENTION

Field of the Invention

The invention pertains to foam material elements and, specifically, to a foam material element for sound-damping cavities. More particularly the element is provided for sound-proofing extruded profiles of metal or plastics material. The element is compressed prior to being inserted into a cavity, weld-sealed in an air-tight film so that it can be inserted through an opening into the cavity. After being inserted, the sealing film is opened and the foam material element expands in air so that it comes into contact with at least two walls of the cavity.

Increasing demands are placed on more lightweight structures of rail vehicles, for both ecological and economic reasons. As a result, more and more lightweight materials are being used in the construction of rail vehicles. Hollow-chambered extruded profiles of light metal, in particular of aluminum materials, are well suited for car box structures. The drawback in using such extruded profiles is the noise they allow to develop. Aluminum extruded profiles have practically zero sound damping, that is flexural waves excited in the corresponding car box structure decay only very slowly and they propagate throughout the complete structure practically without obstruction. This results in a drumming noise (rumbling, roaring) in the car box structure. In addition, two-shell components, such as the above-mentioned extruded profiles, are subject to breakdowns in the sound damping. This phenomenon is termed coincidental breakdown. In two-shell extruded profiles with a land thickness of 2 to 5 mm and a land spacing of typically 20 to 70 mm these breakdowns lie in the audible range and thus have a negative effect on the sound damping behavior.

The drumming behavior of extruded profiles has been fought in the art by applying heavy films of bitumen or plastics to the outer wall of the extruded profiles cavities by spraying, wrapping or bonding.

It has become known in automotive engineering to eliminate air noise such as whistling and the like in cavities by the use of foam material elements in the vicinity of axle bearings. Those elements comprise soft foam material bonded to a carton material. Prior to being inserted in the cavity to be sound deadened the foam material element is available in a compressed condition and is weld-sealed in an air-tight film. In this compressed condition the foam material element can be easily inserted into the cavity through an access opening. Following insertion in the cavity air ingress is made possible by opening the film (for example by tearing or puncturing it open) so that the foam material element expands into a shape that comes into contact with at least two of the cavity walls. That prior art foam material element is suitable only for damping airborne noise, but not for damping material-borne noise, i.e. for anti-drumming.

SUMMARY OF THE INVENTION

It is accordingly an object of the invention to provide a foam element for sound-damping cavities, which overcomes the above-mentioned disadvantages of the heretofore-known devices and methods of this general type and which is suitable for damping noise phenomena that occur in cavities and, more particularly, in extruded profiles of metal or plastics material.

With the foregoing and other objects in view there is provided, in accordance with the invention, a foam material element for sound-damping cavities, which comprises:

a resilient layer of polyurethane soft foam material;

at least one relatively heavier layer of polyurethane flocculated foam compound disposed on the resilient layer; and a seal film air-tightly enclosing the resilient layer and the at least one relatively heavier layer in a compressed condition thereof; and whereby the resilient layer expands to an expanded position thereof when the seal film is opened to allow the entry of air.

In accordance with an added feature of the invention, the resilient layer and the at least one relatively heavier layer are compressed in the seal film prior to being introduced into a cavity, such as into a cavity formed in an extruded profile of metal or plastic, the resilient layer and the at least one relatively heavier layer, after having been introduced in the cavity, expanding into a shape causing contact substantially over a broad surface area with at least two walls of the cavity to be sound-proofed when the resilient layer expands on exposure to air.

In accordance with an additional feature of the invention, the element has two relatively heavier layers. In a preferred embodiment, the two heavy layers are disposed on opposite sides of the resilient layer so that the resilient layer sandwiched in between biases the two heavy layers outwardly against the walls of the cavity as it expands.

In accordance with another feature of the invention, the at least one relatively heavier layer has a weight by volume of approximately 100 to 700 kg/M$^3$, preferably 300 to 400 kg/m$^3$.

In accordance with a further feature of the invention, a weight by volume of the resilient layer is approximately 10 to 80 kg/m$^3$, preferably 40 to 60 kg/m$^3$.

In accordance with again another feature of the invention, the seal film is a diffusion-tight polyethylene sandwich film. The film may have a thickness of approximately 50 to 300 $\mu$m.

In accordance with a concomitant feature of the invention, the film is provided with means for opening or tearing open.

In other words, the objects of the invention are satisfied by configuring the foam material element as a two-layer or multi-layer foam material structure (foam material sandwich) incorporating a resilient layer and at least one heavy layer disposed on the resilient layer. The sandwich establishes a superior anti-drumming means for extruded profiles of metal or plastics material, more particularly of light metal. In the built-in, expanded condition of the foam material element the two heavy layers come into contact with the light metal profile substantially over a broad surface area. The soft foam material of the resilient layer thereby pushes at least one heavy layer against the walls of the cavity to be sound-damped with a specific pressure. The pressurization of the heavy layer by the resilient layer is based on an overdimensioning of the foam material element relative to the cavity to be sound-damped in the direction in which the foam material element expands. Thus at least one heavy layer of the foam material element in accordance with the invention is in direct contact with the light metal extruded profile and complies with every movement in vibration of the extruded profile. These vibrations are absorbed by the foam material element partly in the heavy layer and partly by transfer into the resilient layer and are converted into heat. Ideally vibration energy may also be destroyed by the two light metal outer layers vibrating out of phase. By incorporating the foam material element in accordance with the invention in the cavity to be sound-damped the resistance to flow in the cavity is increased. As a result, the abovementioned coincidence breakdown in the sound-damping can be diminished.

By increasing the resistance to flow thermal convection rolling is also obviated, as a result of which it is now made possible to reduce the dimensioning of the thermal insulating layer in vehicle interiors, thus achieving material and cost savings.

Other features which are considered as characteristic for the invention are set forth in the appended claims.

Although the invention is illustrated and described herein as embodied in a foam material element for sound-damping cavities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic sectional view of a foam material element in accordance with the invention in the compressed condition;

FIG. 2 is a schematic sectional view of the foam material element of FIG. 1 in the expanded condition; and FIG. 3 is a perspective view of a light metal extruded profile with cavities, with one (compressed) foam material element being inserted and one (expanded) foam material element incorporated in a cavity of the extruded profile.

DESCRIPTION OF THE PREFERRED EMBODIMENTS

Referring now to the figures of the drawing in detail and first, particularly, to FIG. 1 thereof, there is seen a cross-section taken through a foam material element 10 in accordance with the invention. The foam material element 10 comprises a springy, resilient layer 11 and two heavy layers 12. The heavy layers 12, i.e. the relatively heavier layers, are disposed on opposite sides of the resilient layer 11. The resilient layer 11 consists more particularly of soft foam polyurethane. The heavy layers 12 consists of a flocculated foam polyurethane compound.

In the condition illustrated in FIG. 1 the foam material element 10 in accordance with the invention exists in the compressed condition and is weld-sealed in an air-tight film 13. By opening the film 13, for example by tearing or puncturing it open, air is able to enter into the pocket inside the film 13 so that the three-layer foam material structure of the foam material element 10 in accordance with the invention expands. The expanded condition 10' is illustrated in FIG. 2, likewise in a schematic section view. The expansion of the foam material element 10 is defined along the direction of expansion as indicated by the double arrow.

As evident from FIGS. 1 and 2 the expansion of the element is primarily caused by the resilient layer 11 consisting of soft foam material. The heavier layers 12 of a flocculated foam compound applied to both sides of the resilient layer expand merely insubstantially. These heavy layers 12 of a flocculated foam compound have a very dense structure so that they can hardly be compressed. By contrast the soft foam material of the resilient layer 11 has an open-cell structure which can be compressed to a high degree.

The compressed condition shown in FIG. 1 (and the upper element in FIG. 3) is retained by weld-seal of the air-tight film 13. The resilient layer expands to its original size and shape only after the film 13 has been opened and the layer is exposed to air.

The weight by volume of the flocculated foam compound of the heavy layers 12 is approximately 100 to 700 kg/m$^3$, preferably between 300 and 400 kg/m$^3$. The weight by volume of the soft foam material of the resilient layer 11 is approximately 10 to 80 kg/M$^3$, preferably between 40 and 60 kg/M$^3$. The thickness of the heavy layers 12 is in the range 2 to 10 mm. The preferred thickness is about 4 to 5 mm. The thickness of the resilient layer 11 depends on its application. It is dimensioned in dependence on the size of the cavity that is to be sounded-deadened. Typically, the thickness of the resilient layer 11 is approximately 5 to 15 mm in the compressed condition (FIG. 1) and approximately 30 to 70 mm in the expanded condition (FIG. 2).

The air-tight film 13 is preferably a diffusion-tight sandwich film of polyethylene, the thickness of which is in the range of approximately 50 to 300 $\mu$m, preferably 150 to 200 $\mu$m.

The foam material element according to the invention may be produced as follows: strips of foam material for the resilient layer and for the heavy layers are first bonded to each other. That sandwich is then inserted in an air-tight film, more particularly a bag-like film. Subsequently, the foam material element in the air-tight film is compressed by being squeezed together from without. The interior of the film is evacuated and the film weld-sealed, as a result of which the compressed condition of the foam material element is retained.

Referring now to FIG. 3, an extruded profile 20 is formed with a cavity 22 and several openings 21 leading into the cavity. The openings 21 are formed along one narrow side 24 of the extruded profile 20. The foam material elements 10 in accordance with the invention are inserted through these openings 21 for sound-damping the cavity 22. In their compressed condition the foam material elements 10 in accordance with the invention have the form of an elongated strip. The foam material elements 10 are introduced through the openings 21 into the cavity 22 in such a way as indicated by the arrow that the heavy layers 12 are located parallel to the two longitudinal sides 23 of the extruded profile 20. The longitudinal sides define the cavity 22. In the compressed condition the foam material elements 10 are narrower than a thickness d of the extruded profile 20 and also narrower than the clear width of the openings 21. Accordingly, the elements 10 can be inserted through the openings 21 with no problem.

After the foam material element 10 has been positioned in the cavity 22 the air-tight film 13 is opened. This can be done by puncturing or tearing the seal film open. The film 13 is preferably provided with means that permit problem-free opening of the film 13. These means may, for example, include a rip thread 14 or the like welded into the film.

After the film 13 has been opened, air enters into the interior of the film 13 and the resilient layer 11 of the foam material element 10 expands such that the heavy layers 12 of the foam material element 10 are forced against the sidewalls 23 of the extruded profile 20 defining the cavity 22. The resilient layer 11 is accordingly dimensioned so that its thickness in the expanded condition corresponds to at least the thickness d of the cavity 22 of the extruded profile 20.

Accordingly in the finish installed condition of the foam material element 10 the heavy layers 12 of the flocculated foam compound come into wide-surface contact with the sidewalls 23 of the light metal extruded profile 20. The vibrations and oscillations of the extruded profile are thereby transferred to the heavy layers 12, from which they are passed on in part to the resilient layer 11. These vibrations are absorbed by both the heavy layer 12 and the resilient layer 11 and converted into heat, as a result of which anti-drumming, i.e. sound-damping of the material-borne noise occurring in an extruded profile is achieved in accordance with the invention.

In addition, flow resistance in the cavity 22 of the extruded profile is increased by the foam material element. As a result, the above-mentioned coincidence breakdown in sound-damping is diminished to a considerable degree. Furthermore, due to the increase in the flow resistance thermal convection rolling is obviated. The good thermal insulation properties of the soft foam material of the resilient layer 11 (coefficient of thermal conductivity at 20° C.: λ0.040 W/mK) also reduces the heat exchange through the structure (inward, outward) quite considerably.

The exemplary embodiment of the novel foam material element as described above and illustrated in the drawing relates to a foam material structure with a substantially rectangular cross-section. Making use of such a rectangular cross-section in actual practice is an ideal case, since the foam material elements need to be adapted to the existing cavity geometry of the extruded profiles employed. This is why foam material elements having substantially a trapezoidal cross-section are more often found in actual practice. Just as likely are foam material elements having a triangular cross-section. Fabricating and applying foam material elements in accordance with the invention having such cross-sections correspond to the fabrication and application as described above in the case of a rectangular cross-section. It will be appreciated that it is not an absolute necessity that two heavy layers are arranged on opposing sides of the resilient layer. Instead, it is also possible to make use of just one heavy layer, for example triangular in cross-section. It is also possible to dispose the heavy layers on two mutually adjoining sides of a resilient layer that is triangular or trapezoidal in cross-section.

We claim:

1. A foam material element for sound-damping cavities, which comprises:

a resilient layer of polyurethane soft foam material;

at least one relatively heavier layer of polyurethane flocculated foam compound disposed on said resilient layer; and a seal film air-tightly enclosing said resilient layer and said at least one relatively heavier layer in a compressed condition thereof; and whereby said resilient layer expands to an expanded position thereof when said seal film is opened to allow the entry of air.

2. The foam material element according to claim 1, wherein said resilient layer and said at least one relatively heavier layer are compressed in said seal film prior to being introduced into a cavity, said resilient layer and said at least one relatively heavier layer, after having been introduced in the cavity, expanding into a shape causing contact substantially over a broad surface area with at least two walls of the cavity to be sound-proofed when said resilient layer expands on exposure to air.

3. The foam material element according to claim 2, wherein the cavity is a cavity formed in an extruded profile of metal.

4. The foam material element according to claim 2, wherein the cavity is a cavity formed in an extruded profile of plastic material.

5. The foam material element according to claim 1, wherein said at least one relatively heavier layer is one of two heavy layers.

6. The foam material element according to claim 5, wherein said two heavy layers are disposed on opposite sides of said resilient layer.

7. The foam material element according to claim 1, wherein said at least one relatively heavier layer has a weight by volume of approximately 100 to 700 kg $/m^3$.

8. The foam material element according to claim 1, wherein said at least one relatively heavier layer has a weight by volume of approximately 300 to 400 $kg/m^3$.

9. The foam material element according to claim 1, wherein a weight by volume of said resilient layer is approximately 10 to 80 $kg/m^3$.

10. The foam material element according to claim 1, wherein a weight by volume of said resilient layer is approximately 40 to 60 $kg/m^3$.

11. The foam material element according to claim 1, wherein said seal film is a diffusion-tight polyethylene sandwich film.

12. The foam material element according to claim 11, wherein said seal film has a thickness of approximately 50 to 300 $\mu$m.

13. The foam material element according to claim 1, wherein said seal film has a thickness of approximately 50 to 300 $\mu$m.

14. The foam material element according to claim 1, wherein said film is provided with means for opening or tearing open.

* * * * *